UNITED STATES PATENT OFFICE.

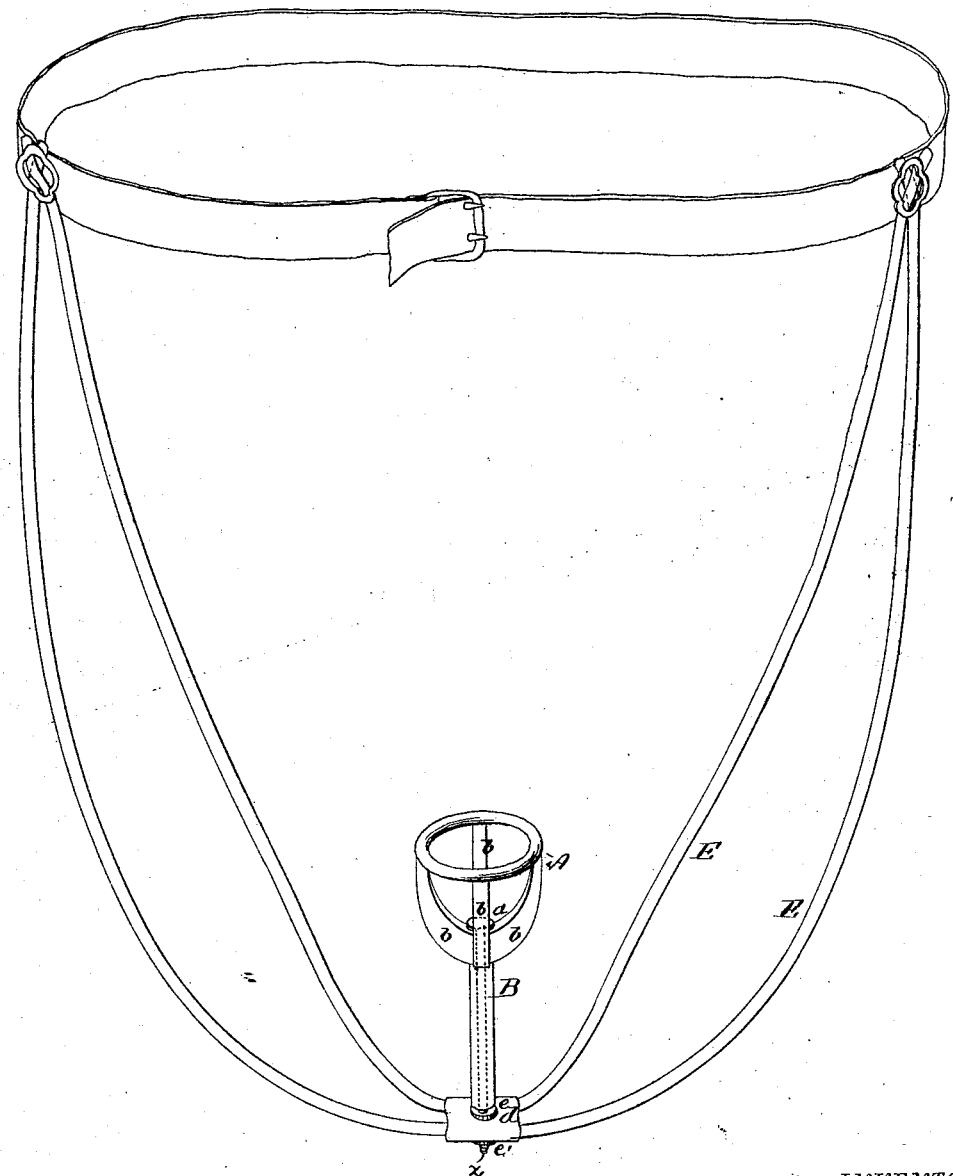

CHARLES E. FLACK, OF JACKSONVILLE, ILLINOIS.

IMPROVEMENT IN PESSARIES.

Specification forming part of Letters Patent No. 145,854, dated December 23, 1873; application filed July 2, 1873.

*To all whom it may concern:*

Be it known that I, CHARLES E. FLACK, of Jacksonville, in the county of Morgan and State of Illinois, have invented certain new and useful Improvements in Uterine Supporters; and I do hereby declare that the following is a full, clear, and exact description thereof, that will enable others skilled in the art to which it appertains to make and use the same, reference being had to the accompanying drawings and to the letters of reference marked thereon, which form a part of this specification.

The drawing is a perspective view of my improvement.

This invention has relation to uterine supporters; and consists, first, in constructing the annular cushion-supporting branches and stem of soft rubber, the cushion and branches being solid, and the latter made tapering from their bases to their upper ends; also, in the combination, with a soft-rubber casing, of a stem made of hard rubber, capable of being bent and allowed to remain in any required position, substantially as specified.

Referring to the accompanying drawings, A designates the open annular cushion, made of soft rubber, and of a diameter just sufficient to fill the vagina without distending it. B represents the hollow stem, made also of soft rubber, and furnished with four curved radial branches, b, connecting it with and supporting the annular cushion A, as shown. These branches are made of soft rubber, also, so as to be sufficiently mobile to conform to the flexions of the body, and are rendered sufficiently stout to sustain the weight they are designed to bear by being transversely enlarged or widened at the base, whence they taper, or gradually diminish in width, to their points of connection with the annular band, as clearly shown in the drawings. The internal springs shown in the patent to Stephenson, before referred to, are dispensed with, the natural elasticity of the rubber being found to furnish all the advantageous qualities of the springs in a more convenient and less expensive form. The stem is provided with four branches instead of two, experience having shown that the latter number are inadequate to the retention of the annular cushion in its proper position. If properly disposed, any number greater than two of the branches may constitute the necessary support to the cushion. The hollow stem B is provided with an internal rod or core, Z, made, preferably, of hard rubber, for which, if desired, any other equivalent material may be substituted, the necessary qualities being that said rod may be bent to any required form, which it will retain, thus rendering the instrument readily conformable to the physical characteristics of the wearer. This rod is formed with a head or knob, a, which rests on the top of the stem, as shown. The lower end of the rod is threaded, and passes through a hole in the connecting-band d of the sustaining-straps, to which it is secured in place by the nuts e e'. By means of these nuts, the rod may be adjusted to elevate or depress the instrument. When inserted in the vagina, the instrument is held in place by the sustaining-straps E, which pass upward exteriorly and posteriorly, and are attached to a belt, which encircles the waist.

Having fully described my invention, what I claim as new, and desire to secure by Letters Patent, is—

1. As a new article of manufacture, a uterine supporter having the annular cushion and supporting-branches made of flexible india-rubber, the annular cushion and branches being solid, and the latter made tapering from their bases to their upper ends, as shown and described.

2. A stem, of hard rubber or other equivalent material, capable of being bent and caused to remain of any required form, in combination with a soft-rubber casing and supporter, substantially as described and shown.

In testimony that I claim the foregoing I have hereunto set my hand this 27th day of May, 1873.

CHAS. E. FLACK.

Witnesses:
O. E. DAYTON,
H. S. COWEN.